United States Patent
Marx et al.

(10) Patent No.: US 11,502,290 B2
(45) Date of Patent: Nov. 15, 2022

(54) COMPOSITE POWDER FOR USE IN THE NEGATIVE ELECTRODE OF A BATTERY AND A BATTERY COMPRISING SUCH A COMPOSITE POWDER

(71) Applicant: Umicore, Brussels (BE)

(72) Inventors: Nicolas Marx, Olen (BE); Stijn Put, Olen (BE); Jean-Sébastien Bridel, Olen (BE)

(73) Assignee: UMICORE, Brussels (BE)

( * ) Notice: Subject to any disclaimer, the term of this patent is extended or adjusted under 35 U.S.C. 154(b) by 318 days.

(21) Appl. No.: 16/961,291

(22) PCT Filed: Dec. 21, 2018

(86) PCT No.: PCT/EP2018/086498
§ 371 (c)(1),
(2) Date: Jul. 10, 2020

(87) PCT Pub. No.: WO2019/137797
PCT Pub. Date: Jul. 18, 2019

(65) Prior Publication Data
US 2021/0083271 A1    Mar. 18, 2021

(30) Foreign Application Priority Data

Jan. 15, 2018  (EP) .................................. 18151683
Jun. 29, 2018  (WO) ................. PCT/EP2018/067571

(51) Int. Cl.
| | | |
|---|---|---|
| *H01M 4/36* | (2006.01) | |
| *H01M 4/587* | (2010.01) | |
| *H01M 4/38* | (2006.01) | |
| *H01M 4/62* | (2006.01) | |
| *H01M 10/0525* | (2010.01) | |
| *H01M 4/02* | (2006.01) | |

(52) U.S. Cl.
CPC ............ *H01M 4/364* (2013.01); *H01M 4/386* (2013.01); *H01M 4/587* (2013.01); *H01M 4/625* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2015/0037681 A1  2/2015  Morita
2018/0342732 A1  11/2018 Troegel et al.

FOREIGN PATENT DOCUMENTS

EP    3133690 A1    2/2017
KR    1020170129922 A  11/2017

OTHER PUBLICATIONS

ISA/EP; International Search Report and Written Opinion for International Patent Application No. PCT/EP2018/086498 dated Apr. 1, 2019, 12 pages.

*Primary Examiner* — Alexandre F Ferre
(74) *Attorney, Agent, or Firm* — NK Patent Law

(57) ABSTRACT

A composite powder for use in the negative electrode of a battery, whereby the composite powder comprises composite particles, whereby the composite particles comprise a matrix material and silicon, whereby the composite particles have a particle size distribution having a d10 and a d90, whereby over at least part of the size range from d10 to d90 the composite particles have a size-dependent silicon content. Preferably a finer fraction of the composite powder has an average particle size D1 and a silicon content S1 and a coarser fraction of the composite powder has an average particle size D2 and a silicon content S2, whereby a size dependence factor F is defined as follows $F=(S2-S1)/(D2-D1)$, whereby the absolute value of the size dependence factor F is at least 0.04 wt % silicon/$\mu$m.

15 Claims, No Drawings

COMPOSITE POWDER FOR USE IN THE NEGATIVE ELECTRODE OF A BATTERY AND A BATTERY COMPRISING SUCH A COMPOSITE POWDER

CROSS-REFERENCE TO RELATED APPLICATIONS

This application is a U.S. National Stage application of International Patent Application No. PCT/EP2018/086498, filed on Dec. 21, 2018, which claims the benefit of International Patent Application No. PCT/EP2018/067571, filed on Jun. 29, 2018, and the benefit of European Patent Application No. 18151683.2, filed on Jan. 15, 2018.

The present invention relates to a composite powder for use in the negative electrode of a battery and a battery comprising such a composite powder.

BACKGROUND

Lithium ion (Li-ion) batteries are currently the best performing batteries and already became the standard for portable electronic devices. In addition, these batteries already penetrated and rapidly gain ground in other industries such as automotive and electrical storage. Enabling advantages of such batteries are a high-energy density combined with a good power performance.

A Li-ion battery typically contains a number of so-called Li-ion cells, which in turn contain a positive electrode, also called cathode, a negative electrode, also called anode, and a separator which are immersed in an electrolyte. The most frequently used Li-ion cells for portable applications are developed using electrochemically active materials such as lithium cobalt oxide or lithium nickel manganese cobalt oxide for the cathode and a natural or artificial graphite for the anode.

It is known that one of the important limitative factors influencing a battery's performance and in particular a battery's energy density is the active material in the anode. Therefore, to improve the energy density, electrochemically active materials using silicon have been investigated over the past years.

A drawback of using a silicon based electrochemically active material in an anode is its large volume expansion during charging, which is as high as 300% when the lithium ions are fully incorporated, e.g. by alloying or insertion, in the anode's active material—a process often called lithiation. The large volume expansion of the silicon based materials during Li incorporation may induce stresses in the silicon, which in turn could lead to a mechanical degradation of the silicon material.

Repeated periodically during charging and discharging of the Li-ion battery, the repetitive mechanical degradation of the silicon electrochemically active material may reduce the life of a battery to an unacceptable level.

In order to accommodate the volume change, composite particles are usually used. In these composite particles, the silicon particles are mixed with a matrix material, usually a carbon-based material.

Further, a negative effect associated with silicon is that a thick SEI, a Solid-Electrolyte Interface, may be formed on the anode. An SEI is a complex reaction product of the electrolyte and lithium, and therefore leads to a loss of lithium availability for electrochemical reactions and therefore to a poor cycle performance, which is the capacity loss per charging-discharging cycle. A thick SEI may further increase the electrical resistance of a battery and thereby limit the achievable charging and discharging rates.

In principle, the SEI formation is a self-terminating process that stops as soon as a 'passivation layer' has formed on the silicon surface. However, because of the volume expansion of silicon, both silicon and the SEI may be damaged during charging (lithiation) and discharging (delithiation), thereby freeing new silicon surface and leading to a new onset of SEI formation.

In the art, the above lithiation/de-lithiation mechanism is generally quantified by a so-called coulombic efficiency, which is defined as a ratio (in % for a charge-discharge cycle) between the energy removed from a battery during discharge compared with the energy used during charging. Most work on silicon-based anode materials is therefore focused on improving said coulombic efficiency.

The accumulation of the deviation from 100% coulombic efficiency over many cycles determines a battery's usable life. Therefore, in simple terms, an anode having a coulombic efficiency of 99.9% is twice as good as an anode having a coulombic efficiency of 99.8%.

The invention concerns a composite powder for use in the negative electrode of a battery, whereby the composite powder comprises composite particles, whereby the composite particles comprise a matrix material and silicon, whereby the composite particles have a particle size distribution having a d10 and a d90, whereby over at least part of the size range from d10 to d90 the composite particles have a size-dependent silicon content.

This can be any type of particle size distribution, for instance a volume-based, number-based or weight-based particle size distribution, but is preferably a volume-based particle size distribution and is preferably measured by laser diffraction. Without further explanation the skilled person will understand that such a particle size distribution will naturally also have a d50.

It was found that such a composite powder gives a superior performance in a battery, especially in terms of coulombic efficiency, compared to a traditional powder in which composite particles contain the same silicon content, irrespective of their size.

Without being bound by theory, this may be explained by the fact that in smaller composite particles, a proportionally larger part of the silicon is close to the surface of the composite particles. This causes more electrolyte decomposition at the surface of exposed silicon particles and thus more SEI formation, which irreversibly consumes lithium and leads to a lower coulombic efficiency.

Preferably, over at least part of the size range from d10 to d90 the composite particles have a size-dependent silicon content with a positive correlation between the particle size and the silicon content. For the avoidance of doubt, a positive correlation means that on average larger particles have a higher silicon content than smaller particles.

In a preferred embodiment, within the size range d10 to d90, a finer fraction of the composite powder has an average particle size D1 and a silicon content S1, whereby a coarser fraction of the composite powder has an average particle size D2 and a silicon content S2, whereby a size dependence factor F is defined as follows $F=(S2-S1)/(D2-D1)$, whereby the value of the size dependence factor F is positive. For the avoidance of doubt, it should be understood that $D2>D1$.

S1 and S2 are expressed in wt % and D1 and D2 are expressed in µm.

Preferably, the value of the size dependence factor F is at least 0.04 wt % silicon/µm.

Preferably D1 and D2 are measured in mutually the same way and S1 and S2 are measured in mutually the same way.

Alternatively, the invention can be defined as a composite powder for use in the negative electrode of a battery, whereby the composite powder comprises composite particles, whereby the composite particles comprise a matrix material and silicon, whereby the composite particles have a particle size distribution having a d10, d50 and d90, whereby, within the size range d10 to d90, a fine fraction of the composite powder has an average particle size D1 and a silicon content S1 and a coarse fraction of the composite powder has an average particle size D2 and a silicon content S2, whereby the composite powder has an average silicon content A, whereby a size dependence factor G is defined as G=((S2−S1)/A)/((D2−D1)/d50), and whereby G is different from 0.

For the avoidance of doubt, it should be understood that D2>D1.

In a preferred embodiment S1, S2 and A are measured using the same method and D1, D2 and d50 are measured using the same method In a preferred embodiment the size dependence factor G is larger than 0, and preferably the size dependence factor G is at least 0.05, more preferably at least 0.10, and even more preferably at least 0.15.

The advantage of using size dependence factor G instead of size dependence factor F is that systematic measurement errors are cancelled out.

The mentioned minimum values of F or G ensure that the size dependency of the silicon content is large enough to have a significant effect. It should be noted however that lower values of the size dependence factors F or G are also expected to have a positive effect, albeit of a lower magnitude.

The average particle size may be determined according to any established method in particle technology. For practical intents the d50 value of a powder of volume-based particle size distribution, as measured by laser diffraction, is often considered to be the average particle size. Also, in this document the average particle size is defined like this, and in the experiments reported later, the measured d50 value is considered to be the average particle size.

Alternatively, the invention can be defined as a composite powder for use in the negative electrode of a battery, whereby the composite powder comprises composite particles, whereby the composite particles comprise a matrix material and silicon, whereby the composite powder comprises composite particles in a range of sizes, whereby the composite particles of a first size D1 have a different average silicon content than the composite particles of a second size D2, whereby D2>D1, whereby in a preferred embodiment the composite particles of the first size D1 have an average silicon content S1, whereby the composite particles of the second size D2 have an average silicon content S2, whereby a size dependence factor F is defined as follows F=(S2−S1)/(D2−D1), whereby the absolute value of the size dependence factor F is at least 0.04 wt % silicon/μm.

As illustration of the calculation of the size dependence factors F and G we take a composite powder with an average silicon content A of 15 wt % and an average particle size of 16 μm, having a fine size fraction from 5 μm to 10 μm with an average particle size D1 of 7.5 μm and having a coarse size fraction from 20 μm to 25 μm with an average particle size D2 of 22.5 μm. In this illustrative example the fine size fraction has a silicon content S1 of 10 wt % and the coarse size fraction has a silicon content S2 of 18wt %.

The size dependence factor F in this illustrative example now has a numerical value of (18−10)/(22.5−7.5)=8 wt % silicon/15 μm=0.53 wt % silicon/μm.

The size dependence factor G in this illustrative example now has a numerical value of ((18−10)/15)/((22.5−7.5)/16)=0.533/0.9372=0.569 and is dimensionless.

Preferably, D1 and D2 and d50 are measured by means of laser diffraction, whereby D1 is defined as the d50-value of the volumetric particle size distribution of the fine fraction and whereby D2 is defined as the d50-value of the volumetric particle size distribution of the coarse fraction.

Preferably, S1 and S2 and A are measured by means of X-Ray fluorescence.

In a preferred embodiment the composite particles have an average particle size, whereby the coarse fraction is formed by the composite particles having a size larger than said average particle size and whereby the fine fraction is formed by the composite particles having a size smaller than said average particle size, whereby preferably the composite particles have a volumetric particle size distribution having a d50 and the average particle size is defined to be said d50.

In preferred embodiments:
  the composite particles have a particle size distribution having a d10 and a d50, whereby, over at least part of the size range from d10 to d50, the composite particles have a size-dependent silicon content with a positive correlation between particle size and silicon content; and/or
  the composite particles have a particle size distribution having a d50 and a d90 whereby, over at least part of the size range from d50 to d90, the composite particles have a size-dependent silicon content with a positive correlation between particle size and silicon content; and/or
  the composite particles have a particle size distribution having a d50, a d25 and a d75, whereby, over the size range from d25 to d50, and/or over the size range from d50 to d75, the composite particles have a size-dependent silicon content with a positive correlation between particle size and silicon content; and/or
  the composite particles have a particle size distribution having a d10 and a d90, whereby, over the size range from d10 to d90, the composite particles have a size-dependent silicon content with a positive correlation between particle size and silicon content; and/or
  D2>D1; and/or
  D2/D1>1.1, preferably D2/D1>1.4 and more preferably D2/D1>1.8; and/or
  the composite particles have a particle size distribution having a d50, whereby D2 is larger than d50 and whereby D1 is smaller than d50; and/or
  the composite particles have a particle size distribution having a d25 and a d75, whereby D1 is smaller than d25 and D2 is larger than d75,
  the size dependence factor F has a positive value; and/or
  said part of the size range from d10 to d90 or said (D2−D1) is at least 1 μm, preferably at least 3 μm, more preferably at least 5 μm and most preferably at least 7 μm; and/or
  said part of the size range from d10 to d90 or said (D2−D1) is at least 5% of the size range from d10 to d90, preferably at least 10% of the size range from d10 to d90, more preferably at least 20% of the size range from d10 to d90 and most preferably at least at least 30% of the size range from d10 to d90.

Preferably the composite powder has a weight fraction other than silicon and oxygen, whereby the content of carbon in this weight fraction other than silicon and oxygen is at least 50 wt %, preferably at least 60 wt %, more preferably at least 70 wt % and most preferably at least 80 wt %. In other words, this means that, when not considering silicon and oxygen, the composite powder has a carbon content of at least 50 wt %, preferably of at least 60 wt %, more preferably of at least 70 wt % and most preferably of at least 80 wt %.

In a preferred embodiment the absolute value of the size dependence factor F is at least 0.08 wt % silicon/μm. More preferably the absolute value of the size dependence factor F is at least 0.15 wt % silicon/μm, and most preferably the absolute value of the size dependence factor F is at least 0.30 wt % silicon/μm.

With increasing values of the size dependence factor F an increasing effect is obtained.

Preferably the composite particles have a particle size distribution having a d50, whereby 2 μm<d50<30 μm.

Preferably the composite particles have a particle size distribution having a d10, whereby 1 μm<d10<10 μm.

Preferably the composite particles have a particle size distribution having a d90, whereby 5 μm<d90<50 μm.

In a preferred embodiment the composite powder has an average silicon content A, whereby A>5.0 wt % and whereby preferably A>7.5 wt %.

In a preferred embodiment the composite powder has an average silicon content A, whereby A<60.0 wt % and whereby preferably A<50.0 wt %.

As is clear to those familiar with this field of technology, the silicon-based particles are embedded in the matrix material, whereby the matrix material separates silicon-based particles or groups of silicon-based particles from other silicon-based particles or groups of silicon-based particles, and whereby the matrix material preferably completely surrounds a majority of the silicon-based particles.

The matrix material may be a continuous phase or a particulate material but is preferably a continuous phase.

In a preferred embodiment of the composite powder, said matrix material is a carbon-based matrix material, and is more preferably pitch or thermally decomposed pitch. In a preferred embodiment of the composite powder the composite powder comprises at least 90% by weight, and preferably at least 95% by weight, of said composite particles.

Alternatively, the matrix material may be metallic but different from silicon, or may be metal oxide or silicon oxide.

Preferably, the silicon is present in the composite powder as silicon-based particles whereby the silicon-based particles are embedded in the matrix material.

Preferably, the composite powder also contains graphite. In this case the particles of the composite powder comprise particles of graphite and particles of matrix material having silicon-based particles embedded in them. In this case the graphite particles and the particles of matrix material are randomly bound together to form particles of composite powder.

Hereby the graphite is distinct from the matrix material and not enclosed in the matrix material. This allows an optimised electrical conductivity of the composite powder.

The silicon-based particles may have any shape, e.g. substantially spherical but also irregularly shaped, rod-shaped, plate-shaped etc.

For clarity it is remarked that the silicon-based particles are normally nano-sized, having a number based average diameter d50 which is less than 150 nm.

In a preferred embodiment the silicon-based particles have a chemical composition having at least 70% by weight of silicon, and preferably having at least 80% by weight of silicon, whereby preferably the silicon-based particles are free of other elements than Si and O.

In a preferred embodiment the silicon-based particles have a number-based particle size distribution having a d50, whereby the particle size of a silicon-based particle is considered to be the largest linear dimension of said particle, whereby less than 8.0% of the silicon-based particles have a particle size which is larger than twice the d50.

The advantage of the invention is that it allows the preparation of anodes having a higher coulombic efficiency. Without being bound by theory the inventors speculate that this may be linked to the fact that larger silicon particles are more susceptible to fracturing due to the mechanical stresses during repeated swelling and shrinking during use, and thereby contribute disproportionately to continuous SEI formation. The near-absence of large silicon particles, defined as larger than twice the average size, is therefore beneficial.

Additionally, lithium incorporation in larger silicon particles, especially into the centre of these, is relatively slow, as this is a diffusion-limited process. As a consequence, larger silicon particles are suspected to be related to limitations in the charge and discharge rates that can be achieved, so that their near-absence is also helpful in improving the capacity at high charge and discharge rates.

In order to obtain the stated advantages to a higher degree, preferably less than 6.0% of the silicon-based particles have a particle size which is larger than twice the d50, more preferably less than 4.0% of the silicon-based particles have a particle size which is larger than twice the d50, yet more preferably less than 2.0% of the silicon-based particles have a particle size which is larger than twice the d50.

The silicon-based particles may be observed via microscopic techniques, in particular SEM and possibly TEM, and their largest linear dimension, in other words, their size as used in this document, may be determined by automated image analysis. The largest linear dimension of a particle is the largest measurable straight-line distance between two points on the periphery of the particle.

For clarity it is remarked that the mentioned percentages concern the number of silicon-based particles which are larger than twice the d50 value, not the weight that these particles represent.

In preferred embodiments the particle size distribution of the silicon-based particles has a d10, whereby (d50−d10)/d50≤0.60, and whereby preferably (d50−d10)/d50≤0.50.

This limits the amount of very fine silicon-based particles, which become very easily highly oxidised during preparation and/or use of the powder, thereby increasing the oxygen content of the powder. The oxygen content has a two-fold negative effect. Firstly, the weight of the powder increases by oxidation, and consequently also the weight of the battery, and secondly the oxidised silicon will lead to an irreversible consumption of lithium and thus a high initial irreversible capacity.

Preferably the particle size distribution of the silicon-based particles has a d10, whereby d10>10 nm, and preferably d10>20 nm.

It will be clear to the skilled person that the composite particles have porosity that is as low as possible, in order to maximise the volumetric capacity of a battery that is produced with these composite particles. A limited amount of porosity is however acceptable. Therefore, in a preferred embodiment the composite particles have a porosity of less than 20 volume % and preferably of less than 10% volume %. Such porosity may be determined by any common method known in the art, for instance by visual observation using SEM or by helium pycnometry.

The invention further concerns a battery comprising any of the variants of the composite powder as defined above, whereby preferably the battery has a negative electrode, whereby the composite powder is present in the negative electrode.

In order to better illustrate the invention, the following experimental results are provided.

Analytical Methods Used

Determination of Oxygen Content

The oxygen contents of the powders in the examples and the counterexamples were determined by the following method, using a Leco TC600 oxygen-nitrogen analyzer. A sample of the powder was put in a closed tin capsule that was put itself in a nickel basket. The basket was put in a graphite crucible and heated under helium as carrier gas to above 2000° C. The sample thereby melts and oxygen reacts with the graphite from the crucible to CO or $CO_2$ gas. These gases are guided into an infrared measuring cell. The observed signal is recalculated to an oxygen content.

Determination of Silicon Content

Silicon contents in composite powders were measured by X-Ray fluorescence using an energy dispersive spectrometer. This method has an experimental random error of +/−0.3 wt % Si.

Determination of Electrochemical Performance

The composite powders to be evaluated were sieved using a 45 μm sieve and mixed with carbon black, carbon fibres and sodium carboxymethyl cellulose binder in water (2.5 wt %). The ratio used was 89 weight parts composite powder/1 weight part carbon black/2 weight parts carbon fibres and 8 weight parts carboxymethyl cellulose (CMC).

These components were mixed in a Pulverisette 7 planetary ball mill for 30 minutes at 250 rpm.

A copper foil cleaned with ethanol was used as current collector. A 200 μm thick layer of the mixed components was coated on the copper foil. The coating was dried for 45 minutes in vacuum at 70° C. A 1.27 $cm^2$ circle was punched from the dried coated copper foil and used as an electrode in a coin cell using lithium metal as counter electrode. The electrolyte was 1M LiPF6 dissolved in EC/DEC 1/1+2% VC+10% FEC solvents. All samples were tested in a coin-cell tester with high precision (Maccor 4000 series).

The coulombic efficiency of repeated charging and discharging cycles was determined at 0.5 C. The average coulombic efficiency of the cycles between the 5th and 50th cycle is reported.

The skilled person will be aware that a small difference in coulombic efficiency per cycle, will have, over the hundreds or thousands of charging-discharging cycles a battery is expected to last, a significant cumulative effect.

Determination of Particle Size of Silicon-Based Particles

In order to measure the particle size of the silicon-based particles following a SEM-based procedure, 500 mg of the active material powder is embedded in 7 g of a resin (Buehler EpoxiCure 2) consisting of a mix of 4 parts Epoxy Resin (20-3430-128) and 1 part Epoxy Hardener (20-3432-032). The resulting sample of 1" diameter is dried during at least 8 hours. It is then polished, first mechanically using a Struers Tegramin-30 until a thickness of maximum 5 mm is reached, and then further polished by ion-beam polishing (Cross Section Polisher Jeol SM-09010) for about 6 hours at 6 kV, to obtain a polished surface. A carbon coating is finally applied on this polished surface by carbon sputtering using a Cressington 208 carbon coater for 12 seconds, to obtain the sample that will be analyzed by SEM.

In order to measure the particle size of the silicon-based particles following a TEM-based procedure, 10 mg of the active material powder is placed in a focused ion beam scanning electrode microscope (FIB-SEM) equipment. A platinum layer is deposited on top of the surface of the active material powder. A lamella of the active material powder is extracted using the FIB, an example of the obtained lamella is given in FIG. 2 (left). This lamella is further placed on a TEM sample holder and analyzed following the procedure described below.

1. The SEM or TEM image of the cross-section is acquired
2. The contrast and brightness settings are adjusted for an easy visualization of the silicon particles
3. At least 1000 single silicon-based particles, not overlapping with another silicon-based particle, are selected from the SEM or TEM image, using a suitable image analysis software. These silicon-based particles can be selected from one or more silicon-based active material particles.
4. The maximum size $d_{max}$ of a silicon particle is determined by measuring the linear distance between the two most distant points on the periphery of the cross-section of the silicon-based particle.
5. $d_{max}$ is measured for each of those at least 1000 particles, so that a particle size distribution can be determined.

Determination of Particle Size of Composite Powders

Particle size distributions for composite powders were determined by laser diffraction on a Malvern Mastersizer 2000. The following measurement conditions were selected: compressed range; active beam length 2.4 mm; measurement range: 300 RF; 0.01 to 900 μm.

The sample preparation and measurement were carried out in accordance with the manufacturer's instructions.

A volume-based particle size distribution of the composite powder, specifying the d10, d50 and d90 values, was determined this way.

EXPERIMENTAL PREPARATION OF COUNTEREXAMPLES AND EXAMPLES

Counterexample 1

Not According to the Invention

A silicon nano powder was obtained by applying a 60 kW radio frequency (RF) inductively coupled plasma (ICP), using argon as plasma gas, to which a micron-sized silicon powder precursor was injected at a rate of circa 50 g/h, resulting in a prevalent (i.e. in the reaction zone) temperature above 2000K. In this first process step the precursor became totally vaporized. In a second process step an argon flow of 18 $Nm^3/h$ was used as quench gas immediately downstream of the reaction zone in order to lower the temperature of the gas below 1600K, causing a nucleation into metallic submicron silicon powder. Finally, a passivation step was performed at a temperature of 100° C. during 5 minutes by adding 100 l/h of a N2/O2 mixture containing 1 mole % oxygen.

The oxygen content of the obtained silicon Nano powder was measured and was 8.7 wt %.

The particle size distribution of the silicon nano powders was determined to be: d10=43nm, d50=86 nm, d90=128 nm, d95=139 nm, d99=177 nm. The percentage of particles larger than two times d50 was 1.4%.

In order to produce a composite powder, a blend was made of 16 g of the mentioned silicon nano powder and 32 g petroleum-based pitch powder.

This was heated to 450° C. under N2, so that the pitch melted, and, after a waiting period of 60 minutes, mixed for 30 minutes under high shear by means of a Cowles dissolver-type mixer operating at 1000 rpm.

The mixture of silicon nano powder in pitch thus obtained was cooled under $N_2$ to room temperature and, once solidified, pulverized and sieved on a 400 mesh sieve, to produce an intermediate composite powder.

16 g of the intermediate composite powder was mixed with 24.6 g graphite for 3 hrs on a roller bench, after which the obtained mixture was passed through a mill to de-agglomerate it. At these conditions good mixing is obtained but the graphite does not become embedded in the pitch.

A thermal after-treatment was given to the obtained mixture of silicon, pitch and graphite as follows: the product was put in a quartz crucible in a tube furnace, heated up at a heating rate of 3° C./min to 1000° C. and kept at that temperature for two hours and then cooled. All this was performed under argon atmosphere.

The fired product was ball-milled for 1 hr at 200 rpm with alumina balls and sieved over a 40 micrometer sieve to form a final composite powder, further called composite powder CE 1.

The total Si content in composite powder CE 1 was measured to be 14.7 wt % by XRF, having an experimental error of +/−0.3 wt %. This corresponds to a calculated value based on a weight loss of the pitch upon heating of circa 40 wt % and an insignificant weight loss upon heating of the other components. The particle size distribution of composite powder CE 1 was measured and is reported in table 1. The oxygen content of the composite powder CE 1 was measured to be 1.8 wt %.

A sample of composite powder CE 1 was sieved over sieves of 8 μm, 10 μm, 12 μm, 15 μm, 20 μm, 25 μm, 30 μm and 40 μm. The particle size distributions and silicon and oxygen contents of the various size fractions were determined and are reported in table 1.

The sieved size fractions were not further used. Further experiments were done on composite powder CE 1.

TABLE 1

|  | Si Content (wt %) | O content (wt %) | d10 (μm) | d50 (μm) | d90 (μm) |
|---|---|---|---|---|---|
| Composite powder CE 1 | 14.7 | 1.8 | 5 | 14.2 | 40.8 |
| Fraction < 8 μm | 14.9 | 1.9 | 2.6 | 5.8 | 9.1 |
| Fraction 8 μm-10 μm | 14.8 | 1.9 | 3.6 | 7.2 | 11.4 |
| Fraction 10 μm-12 μm | 14.7 | 1.9 | 4.3 | 8.1 | 13.1 |
| Fraction 12 μm-15 μm | 14.7 | 1.8 | 6.0 | 10.5 | 16.2 |
| Fraction 15 μm-20 μm | 14.8 | 1.8 | 8.1 | 14.1 | 22.7 |
| Fraction 20 μm-25 μm | 14.6 | 1.7 | 11.2 | 16.9 | 28.3 |
| Fraction 25 μm-30 μm | 14.8 | 1.8 | 14.4 | 21.2 | 33.9 |
| Fraction 30 μm-40 μm | 14.6 | 1.7 | 20.1 | 28.5 | 45.3 |

As stated, the experimental error of the measurement of the silicon content was 0.3%. It can therefore be seen that, within the experimental error margin, the silicon content of the various size fractions is the same and there is no size dependency of the silicon content, in other words the size dependence factors F and G are 0.

Example 1

According to the Invention

In order to produce a composite powder according to the invention, eight separate composite powders were produced, analogously to the counterexample 1. These eight composite powders differed from composite powder CE 1 in that the silicon contents were different. This was done by adapting the ratio of the aforementioned intermediate composite powder and graphite.

Composite powders with silicon contents of 8.2 wt %, 9.8 wt %, 11.4 wt %, 13.3 wt %, 14.9 wt %, 16.1 wt %, 18.2 wt % and 20.1 wt % were produced.

Each of these composite powders were sieved over the sieves as mentioned in relation to CE 1, so that eight size ranges were obtained for each of the eight composite powders, so in total 64 different powders.

Then, a mixture was made of several of these 64 different powders, as detailed in table 2, to obtain composite powder E 1, having the same silicon content as composite powder CE 1, so 14.7 wt % and having 1.9 wt % oxygen.

TABLE 2

Constituent powders used for making E 1

| Silicon content of constituent powder | size fraction which was used of this constituent powder | weight percentage which was used of this size fraction in the final mixture |
|---|---|---|
| 8.2 wt % Si | Fraction < 8 μm | 3.0% |
| 9.8 wt % Si | Fraction 8 μm-10 μm | 6.0% |
| 11.4 wt % Si | Fraction 10 μm-12 μm | 10.0% |
| 13.3 wt % Si | Fraction 12 μm-15 μm | 16.0% |
| 14.9 wt % Si | Fraction 15 μm-20 μm | 26.0% |
| 16.1 wt % Si | Fraction 20 μm-25 μm | 21.0% |
| 18.2 wt % Si | Fraction 25 μm-30 μm | 15.0% |
| 20.1 wt % Si | Fraction 30 μm-40 μm | 3.0% |

The particle size distributions of the composite powder E 1 and of the size fractions used are given in table 3.

TABLE 3

Size distribution of E 1 and of the constituent powder fractions used for making it

| Powder | size fraction | d10 (μm) | d50 (μm) | d90 (μm) |
|---|---|---|---|---|
| 8.2 wt % Si | Fraction < 8 μm | 2.8 | 5.9 | 9.2 |
| 9.8 wt % Si | Fraction 8 μm-10 μm | 3.8 | 7.0 | 11.5 |
| 11.4 wt % Si | Fraction 10 μm-12 μm | 4.5 | 8.3 | 13.1 |
| 13.3 wt % Si | Fraction 12 μm-15 μm | 6.2 | 10.5 | 16.1 |
| 14.9 wt % Si | Fraction 15 μm-20 μm | 8.1 | 14.2 | 22.9 |
| 16.1 wt % Si | Fraction 20 μm-25 μm | 11.0 | 17.8 | 28.1 |
| 18.2 wt % Si | Fraction 25 μm-30 μm | 14.7 | 21.2 | 34.2 |
| 20.1 wt % Si | Fraction 30 μm-40 μm | 20.3 | 28.7 | 45.8 |
| Composite powder E 1 | total | 5.1 | 14.4 | 39.5 |

As an example, a first size dependence factor F indicating the dependence of the silicon content on the particle size, calculated based on the coarsest and the finest fraction of E 1, can be determined to be (20.1−8.2)/(28.7−5.9)=0.52 wt % silicon/μm.

As a further example, a second size dependence factor G indicating the dependence of the silicon content on the particle size, calculated based on the coarsest and the finest fraction of E 1, can be determined to be ((20.1−8.2)/14.7)/((28.7−5.9)/14.4)=0.51.

Analogously, first and second size dependence factors F and G can be calculated for each combination of the other size fractions.

If desired, the dependence of the silicon content on the particle size of composite powder E 1 can be calculated from the size distributions of the constituent powder fractions of composite powder E 1, under the assumption that within each individual constituent powder fraction the silicon content does not depend on the particle size. The correctness of this assumption is demonstrated by CE 1.

Counterexamples 2 and 3

Not According to the Invention

Analogously to composite powder CE 1, two further counter-example composite powders were made having different silicon contents, by adapting the ratio of the aforementioned intermediate composite powder and graphite.

This concerned composite powder CE 2, having properties as detailed in table 4, and composite powder CE 3, having properties as detailed in table 5.

TABLE 4

|  | Si Content (wt %) | O content (wt %) | d10 (µm) | d50 (µm) | d90 (µm) |
|---|---|---|---|---|---|
| Composite powder CE 2 | 24.9 | 3.0 | 5.8 | 14.7 | 42.4 |
| Fraction < 8 µm | 25.0 | 3.1 | 2.5 | 6.0 | 9.1 |
| Fraction 8 µm-10 µm | 24.9 | 3.1 | 3.8 | 7.5 | 11.8 |
| Fraction 10 µm-12 µm | 25.1 | 3.0 | 4.4 | 9.1 | 13.7 |
| Fraction 12 µm-15 µm | 24.8 | 3.0 | 6.2 | 10.7 | 16.1 |
| Fraction 15 µm-20 µm | 24.9 | 3.0 | 7.9 | 14.0 | 22.6 |
| Fraction 20 µm-25 µm | 24.7 | 2.9 | 11.2 | 17.7 | 28.4 |
| Fraction 25 µm-30 µm | 24.8 | 2.9 | 14.6 | 21.0 | 33.7 |
| Fraction 30 µm-40 µm | 24.8 | 2.8 | 20.3 | 28.6 | 45.2 |

TABLE 5

|  | Si Content (wt %) | O content (wt %) | d10 (µm) | d50 (µm) | d90 (µm) |
|---|---|---|---|---|---|
| Composite powder CE 3 | 35.2 | 5.1 | 5.5 | 14.6 | 41.8 |
| Fraction < 8 µm | 35.3 | 5.2 | 2.3 | 6.1 | 9.4 |
| Fraction 8 µm-10 µm | 35.1 | 5.2 | 3.6 | 7.6 | 11.7 |
| Fraction 10 µm-12 µm | 35.0 | 5.2 | 4.4 | 9.4 | 14.0 |
| Fraction 12 µm-15 µm | 35.0 | 5.1 | 6.2 | 10.4 | 15.9 |
| Fraction 15 µm-20 µm | 35.2 | 5.1 | 8.0 | 14.3 | 22.2 |
| Fraction 20 µm-25 µm | 35.2 | 5.0 | 11.5 | 17.0 | 28.6 |
| Fraction 25 µm-30 µm | 35.3 | 4.9 | 14.5 | 21.6 | 34.2 |
| Fraction 30 µm-40 µm | 35.1 | 4.9 | 20.0 | 28.6 | 45.1 |

Examples 2 and 3

According to the Invention

Analogously to composite powder E 1, two further example composite powders were made having silicon contents matching composite powders CE 2 and CE 3.

This concerned composite powder E 2, having a silicon content of 24.9 wt % and an oxygen content of 3.1 wt % and further properties as detailed in tables 6 and 7 and composite powder E 3, having a silicon content of 35.2 wt % and an oxygen content of 5.0 wt %, and further having properties as detailed in tables 8 and 9.

TABLE 6

Constituent powders used for making E 2

| Silicon content of constituent powder | size fraction which was used of this constituent powder | weight percentage which was used of this size fraction in the final mixture |
|---|---|---|
| 18.6 wt % Si | Fraction < 8 µm | 4.0% |
| 20.2 wt % Si | Fraction 8 µm-10 µm | 8.0% |
| 22.1 wt % Si | Fraction 10 µm-12 µm | 12.0% |
| 24.1 wt % Si | Fraction 12 µm-15 µm | 18.0% |
| 25.2 wt % Si | Fraction 15 µm-20 µm | 24.0% |
| 26.9 wt % Si | Fraction 20 µm-25 µm | 19.0% |
| 29.1 wt % Si | Fraction 25 µm-30 µm | 13.0% |
| 30.5 wt % Si | Fraction 30 µm-40 µm | 2.0% |

TABLE 7

Size distribution of E 2 and of the constituent powder fractions used for making it

| Powder | Size fraction | d10 (µm) | d50 (µm) | d90 (µm) |
|---|---|---|---|---|
| 18.6 wt % Si | Fraction < 8 µm | 2.7 | 6.2 | 9.3 |
| 20.2 wt % Si | Fraction 8 µm-10 µm | 3.8 | 7.6 | 12.1 |
| 22.1 wt % Si | Fraction 10 µm-12 µm | 4.5 | 8.9 | 13.8 |
| 24.1 wt % Si | Fraction 12 µm-15 µm | 6.4 | 11.0 | 16.3 |
| 25.2 wt % Si | Fraction 15 µm-20 µm | 8.0 | 14.2 | 22.9 |
| 26.9 wt % Si | Fraction 20 µm-25 µm | 11.2 | 17.5 | 28.6 |
| 29.1 wt % Si | Fraction 25 µm-30 µm | 14.5 | 21.1 | 34.2 |
| 40.5 wt % Si | Fraction 30 µm-40 µm | 20.0 | 28.6 | 44.8 |
| Composite powder CE 2 | Total | 5.9 | 14.5 | 41.9 |

TABLE 8

| Silicon content of constituent powder | size fraction which was used of this constituent powder | weight percentage which was used of this size fraction in the final mixture |
|---|---|---|
| 27.9 wt % Si | Fraction < 8 µm | 4.0% |
| 29.0 wt % Si | Fraction 8 µm-10 µm | 7.0% |
| 30.9 wt % Si | Fraction 10 µm-12 µm | 10.0% |
| 32.9 wt % Si | Fraction 12 µm-15 µm | 15.0% |
| 35.7 wt % Si | Fraction 15 µm-20 µm | 26.0% |
| 37.5 wt % Si | Fraction 20 µm-25 µm | 21.0% |
| 39.8 wt % Si | Fraction 25 µm-30 µm | 13.0% |
| 41.4 wt % Si | Fraction 30 µm-40 µm | 4.0% |

TABLE 9

Size distribution of E 3 and of the constituent powder fractions used for making it

| Powder | Size fraction | d10 (um) | d50 (um) | d90 (um) |
|---|---|---|---|---|
| 27.9 wt % Si | Fraction < 8 µm | 2.2 | 5.9 | 9.4 |
| 29.0 wt % Si | Fraction 8 µm-10 µm | 3.5 | 7.8 | 11.2 |
| 30.9 wt % Si | Fraction 10 µm-12 µm | 4.9 | 9.0 | 14.3 |
| 32.9 wt % Si | Fraction 12 µm-15 µm | 6.4 | 10.7 | 16.8 |
| 35.7 wt % Si | Fraction 15 µm-20 µm | 8.4 | 14.1 | 22.0 |
| 37.5 wt % Si | Fraction 20 µm-25 µm | 12.0 | 17.5 | 28.4 |
| 39.8 wt % Si | Fraction 25 µm-30 µm | 14.5 | 21.5 | 33.9 |
| 41.4 wt % Si | Fraction 30 µm-40 µm | 20.4 | 28.4 | 44.1 |
| Composite powder E 3 | Total | 5.4 | 14.4 | 41.3 |

With respect to E 2, As an example, a first size dependence factor F indicating the dependence of the silicon content on the particle size, calculated based on the fraction 20 µm-25 µm and the fraction 10 µm-12 µm of E 2, can be determined to be (26.9−22.1)/(17.5−8.9)=0.56 wt % silicon/µm.

As a further example, a second size dependence factor G indicating the dependence of the silicon content on the particle size, calculated based on same fractions of E 2, can be determined to be ((26.9−22.1)/24.9)/((17.5−8.9)/14.5)=0.33.

Similarly, with respect to E 3, as an example, a first size dependence factor F indicating the dependence of the silicon content on the particle size, calculated based on the fraction 25 µm-30 µm and the fraction 12 µm-15 µm of E3, can be determined to be (39.8−32.9)/(21.5−10.7)=0.64 wt % silicon/µm.

As a further example, a second size dependence factor G indicating the dependence of the silicon content on the particle size, calculated based on same fractions of E 3, can be determined to be ((39.8−32.9)/35.2)/((21.5−10.7)/14.4)=0.26

Analogously, first and second size dependence factors F and G can be calculated for each combination of the other size fractions.
Analysis of Counterexamples 1,2 and 3 and Examples 1,2 and 3

A BET surface area was determined for all composite powders produced in counterexamples 1,2 and 3 and examples 1,2 and 3. The values are reported in table 10.

TABLE 10

| Powder | BET (m²/g) |
|---|---|
| CE 1 | 3.5 |
| CE 2 | 3.8 |
| CE 3 | 3.7 |
| E 1 | 3.6 |
| E 2 | 3.8 |
| E 3 | 3.9 |

All composite powders CE 1, CE 2, CE 3. E 1, E 2 and E 3 were embedded in resin and observed by SEM. No porosity could be observed in any of these composite powders, which is equivalent to the composite powders having 0% porosity as measured by this method. As the observance of less than 5 volume % porosity by this method is difficult, the actual porosity is estimated to be between 0 and 5 volume %.

The electrochemical performance of the composite powder CE 1, CE 2, CE 3. E 1, E 2 and E 3 was measured. The results are shown in table 11, below.

TABLE 11 electrochemical performance of the composite powders
CE 1, CE 2, CE 3. E 1, E 2 and E 3

| Composite powder | Total Capacity mAh/gcomposite | Coulombic efficiency, average of cycles 5 to 50 (%) |
|---|---|---|
| CE 1 | 734 | 99.50 |
| E 1 | 736 | 99.76 |
| CE 2 | 992 | 99.39 |
| E 2 | 996 | 99.68 |
| CE 3 | 1269 | 98.83 |
| E 3 | 1266 | 99.22 |

It can be seen that for all silicon contents (circa 15 wt %, circa 25wt % and circa 35 wt %), the composite powder according to the invention performs significantly better than the composite powder not according to the invention.

Counterexample 4

Not According to the Invention

The same silicon nanopowder as used in counterexample 1 was used.

In order to produce a composite powder, a blend was made of 15 g of the mentioned silicon nano powder and 75 g of petroleum based pitch powder.

This was heated to 450° C. under N2, so that the pitch melted, and, after a waiting period of 60 minutes, mixed for 30 minutes under high shear by means of a Cowles dissolver-type mixer operating at 1000 rpm.

The mixture of silicon nano powder in pitch thus obtained was cooled under $N_2$ to room temperature and, once solidified, pulverized and sieved on a 400 mesh sieve, to produce an unfired composite powder.

A thermal after-treatment was given to the unfired composite powder as follows: the unfired composite powder was put in a thin layer in quartz crucibles in a tube furnace, heated up at a heating rate of 3° C./min to 1000° C. and kept at that temperature for two hours and then cooled. All this was performed under argon atmosphere.

The fired product was ball-milled for 2 hrs at 400 rpm with alumina balls and sieved over a 40 micrometer sieve to form a final composite powder, further called composite powder CE 4.

The total Si content in composite powder CE 4 was measured to be 24.8 wt % by XRF, having an experimental error of +/−0.3 wt %. This corresponds to a calculated value based on a weight loss of the pitch upon heating of circa 40 wt %.

The particle size distribution of composite powder CE 4 was measured and is reported in table 12. The oxygen content of the composite powder CE 4 was measured to be 3.1 wt %.

A sample of composite powder CE 4 was sieved over sieves of 8 µm, 10 µm, 12 µm, 15 µm, 20 µm, 25 µm, 30 µm and 40 µm. The particle size distributions and silicon and oxygen contents of the various size fractions were determined and are reported in table 1.

The sieved size fractions were not further used. Further experiments were done on composite powder CE 4.

TABLE 12

| | Si Content (wt %) | O content (wt %) | d10 (µm) | d50 (µm) | d90 (µm) |
|---|---|---|---|---|---|
| Composite powder CE 4 | 24.8 | 3.1 | 7.0 | 16.3 | 44.9 |
| Fraction < 8 µm | 24.9 | 3.1 | 3.0 | 5.8 | 9.1 |
| Fraction 8 µm-10 µm | 24.8 | 3.2 | 3.6 | 7.2 | 11.4 |
| Fraction 10 µm-12 µm | 24.6 | 3.0 | 4.5 | 8.1 | 13.9 |
| Fraction 12 µm-15 µm | 25.1 | 3.0 | 6.3 | 10.9 | 17.0 |
| Fraction 15 µm-20 µm | 24.9 | 3.1 | 8.0 | 14.3 | 21.9 |
| Fraction 20 µm-25 µm | 24.8 | 3.0 | 11.5 | 17.1 | 27.3 |
| Fraction 25 µm-30 µm | 24.8 | 3.1 | 14.8 | 22.2 | 34.5 |
| Fraction 30 µm-40 µm | 24.7 | 3.1 | 22.1 | 29.3 | 47.0 |

The experimental error of the measurement of the silicon content was 0.3%. It can therefore be seen that, within the experimental error margin, the silicon content of the various size fractions is the same and there is no size dependency of the silicon content.

Example 4

According to the Invention

In order to produce a composite powder according to the invention, eight separate composite powders were produced, analogously to the counterexample 4. These eight composite powders differed from composite powder CE 4 in that the silicon contents were different. This was done by adapting the ratio of pitch and nano silicon powder.

Composite powders with silicon contents of 18.4 wt %, 19.7 wt %, 20.9 wt %, 22.8 wt %, 24.7 wt %, 26.4 wt %, 28.7 wt % and 30.6 wt % were produced.

Each of these composite powders were sieved over the sieves as mentioned in relation to CE 4, so that eight size ranges were obtained for each of the eight composite powders, so in total 64 different powders were obtained.

Then, a mixture was made of several of these 64 different powders, as detailed in table 13, to obtain composite powder E 4, having the same silicon content as composite powder CE 4, so 24.8 wt % and having 3.1 wt % oxygen.

TABLE 13

Constituent powders used for making E 4

| Silicon content of constituent powder | size fraction which was used of this constituent powder | weight percentage which was used of this size fraction in the final mixture |
|---|---|---|
| 18.4 wt % Si | Fraction < 8 μm | 3.0 % |
| 19.7 wt % Si | Fraction 8-10 μm | 6.0 % |
| 20.9 wt % Si | Fraction 10-12 μm | 11.0 % |
| 22.8 wt % Si | Fraction 12-15 μm | 15.0 % |
| 24.7 wt % Si | Fraction 15-20 μm | 24.0 % |
| 26.4 wt % Si | Fraction 20-25 μm | 21.0 % |
| 28.7 wt % Si | Fraction 25-30 μm | 14.0 % |
| 30.6 wt % Si | Fraction 30-40 μm | 6.0 % |

The particle size distributions of the composite powder E 4 and of the size fractions used are given in table 14.

TABLE 14

Size distribution of E 4 and of the constituent powder fractions used for making it

| Powder | size fraction | d10 (μm) | d50 (μm) | d90 (μm) |
|---|---|---|---|---|
| 18.4 wt % Si | Fraction < 8 μm | 3.2 | 6.0 | 9.0 |
| 19.7 wt % Si | Fraction 8-10 μm | 3.4 | 7.2 | 11.5 |
| 20.9 wt % Si | Fraction 10-12 | 4.3 | 9.3 | 14.1 |
| 22.8 wt % Si | Fraction 12-15 | 6.2 | 11.0 | 16.9 |
| 24.7 wt % Si | Fraction 15-20 μm | 8.1 | 14.3 | 21.8 |
| 26.4 wt % Si | Fraction 20-25 μm | 11.6 | 17.2 | 27.5 |
| 28.7 wt % Si | Fraction 25-30 μm | 14.8 | 22.4 | 34.7 |
| 30.6 wt % Si | Fraction 30-40 μm | 21.9 | 29.5 | 47.1 |
| Composite powder E 4 | total | 6.9 | 16.1 | 44.8 |

A first size dependence factor F indicating the dependence of the silicon content on the particle size, calculated based on the coarsest fraction and the fraction 8-10 μm can be determined to be $(30.6-19.7)/(29.5-7.2)=0.49$ wt % silicon/μm.

A second size dependence factor G indicating the dependence of the silicon content on the particle size, calculated based on the coarsest fraction and the fraction 8-10 μm, can be determined to be $((30.6-19.7)/24.8)/((29.5-7.2)/16.1)=0.32$.

Analogously, first and second size dependence factors F and G can be calculated for each combination of other fractions.

Analysis of Counterexample 4 and Example 4

A BET surface area was determined for the samples E 4 and CE 4. The values were 7.4 and 7.6 m²/g respectively.

Composite powders CE 4 and E 4 were embedded in resin and observed by SEM. No porosity could be observed in any of these composite powders The electrochemical performance of the composite powders CE 4 and E 4 was measured. The results are shown in table 15, below.

TABLE 15

Electrochemical performance of the composite powders CE 4 and E 4

| Composite powder | Total Capacity mAh/g composite | Coulombic efficiency, average of cycles 5 to 50 (%) |
|---|---|---|
| CE 4 | 932 | 99.09 |
| E 4 | 935 | 99.34 |

As already seen previously for the composites CE 1, CE 2, CE 3, E 1, E 2 and E 3, the composite powder E 4 according to the invention performs significantly better than the composite powder CE 4 not according to the invention.

The invention claimed is:

1. A composite powder for use in a negative electrode of a battery, the composite powder comprising composite particles, which comprise a matrix material and silicon, wherein the composite particles have a volumetric particle size distribution having a d10 and a d90, wherein, over at least part of the size range from d10 to d90, the composite particles have a size-dependent silicon content, with a positive correlation between the particle size and the silicon content, wherein a fine fraction of the composite powder has an average particle size D1 and a silicon content S1 and a coarse fraction of the composite powder has an average particle size D2 and a silicon content S2, and a size dependence factor F is defined as $F=(S2-S1)/(D2-D1)$, wherein the value of the size dependence factor F is at least 0.04 wt % silicon/μm, and wherein D1 is defined as the d50-value of the volumetric particle size distribution of the fine fraction as measured by laser diffraction and D2 is defined as the d50-value of the volumetric particle size distribution of the coarse fraction as measured by laser diffraction.

2. The composite powder according to claim 1, wherein S1 and S2 are as measured by means of X-Ray fluorescence.

3. The composite powder according to claim 1, wherein the matrix material is a carbon-based matrix material.

4. The composite powder according to claim 1, wherein the composite powder has a content of carbon in the fraction other than silicon and oxygen of at least 50 wt %.

5. The composite powder according to claim 1, wherein the value of the size dependence factor F is at least 0.15 wt % silicon/μm.

6. The composite powder according to claim 1, wherein the value of the size dependence factor F is at least 0.30 wt % silicon/μm.

7. The composite powder according to claim 1, wherein the composite powder has an average silicon content A, wherein 5.0wt %<A<60wt %.

8. The composite powder according to claim 7, wherein 7.5wt %<A<50wt %.

9. The composite powder according to claim 1, wherein the composite powder has an oxygen content and an average silicon content A expressed as wt %, wherein the oxygen content expressed in wt % is less than 33% of A.

10. The composite powder according to claim 1, wherein the composite powder has a BET value of less than 10 m²/g.

11. The composite powder according to claim 1, wherein the composite powder comprises at least 90% by weight of said composite particles.

12. The composite powder according to claim 1, wherein the composite powder also contains graphite.

13. The composite powder according to claim 1, wherein the silicon is present as silicon-based particles embedded in the matrix material.

14. The composite powder according to claim 1, wherein the silicon-based particles have a chemical composition having at least 70% by weight of silicon.

15. A battery comprising the composite powder of claim 1.

* * * * *